(12) United States Patent
Nomura et al.

(10) Patent No.: US 11,411,494 B2
(45) Date of Patent: Aug. 9, 2022

(54) REFERENCE CURRENT SOURCE CIRCUIT

(71) Applicant: ROHM Co., LTD., Kyoto (JP)

(72) Inventors: Naohiro Nomura, Kyoto (JP);
Takatoshi Manabe, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 4 days.

(21) Appl. No.: 17/160,520

(22) Filed: Jan. 28, 2021

(65) Prior Publication Data

US 2021/0242772 A1 Aug. 5, 2021

(30) Foreign Application Priority Data

Jan. 31, 2020 (JP) .............................. JP2020-015230

(51) Int. Cl.
*G05F 3/24* (2006.01)
*G05F 3/26* (2006.01)
*H02M 3/155* (2006.01)

(52) U.S. Cl.
CPC ............ *H02M 3/155* (2013.01); *G05F 3/242* (2013.01)

(58) Field of Classification Search
CPC ............................................... G05F 3/242–267
See application file for complete search history.

(56) References Cited

U.S. PATENT DOCUMENTS

| | | | | |
|---|---|---|---|---|
| 8,786,360 B2 * | 7/2014 | Ang | ..................... | G05F 3/262 327/108 |
| 10,181,849 B1 * | 1/2019 | Naass | ................ | H03K 17/6872 |
| 10,642,306 B1 * | 5/2020 | Shankar | ................ | H02H 7/1213 |
| 10,754,369 B2 * | 8/2020 | Nomura | ................ | H03K 3/0231 |
| 2006/0091940 A1 * | 5/2006 | Kimura | ................... | G05F 3/262 327/543 |
| 2012/0229117 A1 * | 9/2012 | Nikolov | .................. | G05F 3/242 323/313 |
| 2013/0193935 A1 * | 8/2013 | Pan | .......................... | G05F 5/00 323/299 |

(Continued)

FOREIGN PATENT DOCUMENTS

| JP | 2001344028 | 12/2001 |
|---|---|---|
| JP | 2006133869 | 5/2006 |

(Continued)

OTHER PUBLICATIONS

English Machine translation "JP6640507" Nomura Reference Current Source Circuit and Semiconductor Integrated Circuit (Year: 2017).*

*Primary Examiner* — Sisay G Tiku
(74) *Attorney, Agent, or Firm* — Chip Law Group (57) ABSTRACT

A first current mirror circuit is provided between a first transistor and a power supply line to return a current that flows to the first transistor. A second current mirror circuit returns an output current from the first current mirror circuit, and generates a starting current. An inverter has an input connected to a node, and an output connected to a control terminal of the first transistor. A first current source generates a first current when a power supply voltage has exceeded a first threshold value. A third current mirror circuit draws a current proportional to the first current from an input side of the second current mirror circuit. A second current source supplies a second current to the node when the power supply voltage has exceeded a second threshold value.

8 Claims, 8 Drawing Sheets

(56) References Cited

U.S. PATENT DOCUMENTS

2020/0050231 A1* 2/2020 Nomura ............... H03K 3/0231
2021/0270878 A1* 9/2021 Yaguchi ............ G01R 19/0038

FOREIGN PATENT DOCUMENTS

| JP | 2017059056 A | * | 3/2017 | |
|----|----|----|----|----|
| JP | 6640507 B2 | * | 2/2020 | |
| JP | 2020042776 A | * | 3/2020 | ............ G05F 3/247 |

* cited by examiner

REFERENCE CURRENT SOURCE CIRCUIT

CROSS REFERENCE TO RELATED APPLICATIONS

This application claims priority benefit of Japanese Patent Application No. JP 2020-015230 filed in the Japan Patent Office on Jan. 31, 2020. Each of the above-referenced applications is hereby incorporated herein by reference in its entirety.

BACKGROUND

The present disclosure relates to a reference current source circuit.

A common semiconductor integrated circuit is provided with a reference current source circuit that generates a constant reference current that does not depend on a power supply voltage or the like, and copies of this reference current are delivered as bias currents to various circuit blocks in the semiconductor integrated circuit.

Figure 1:
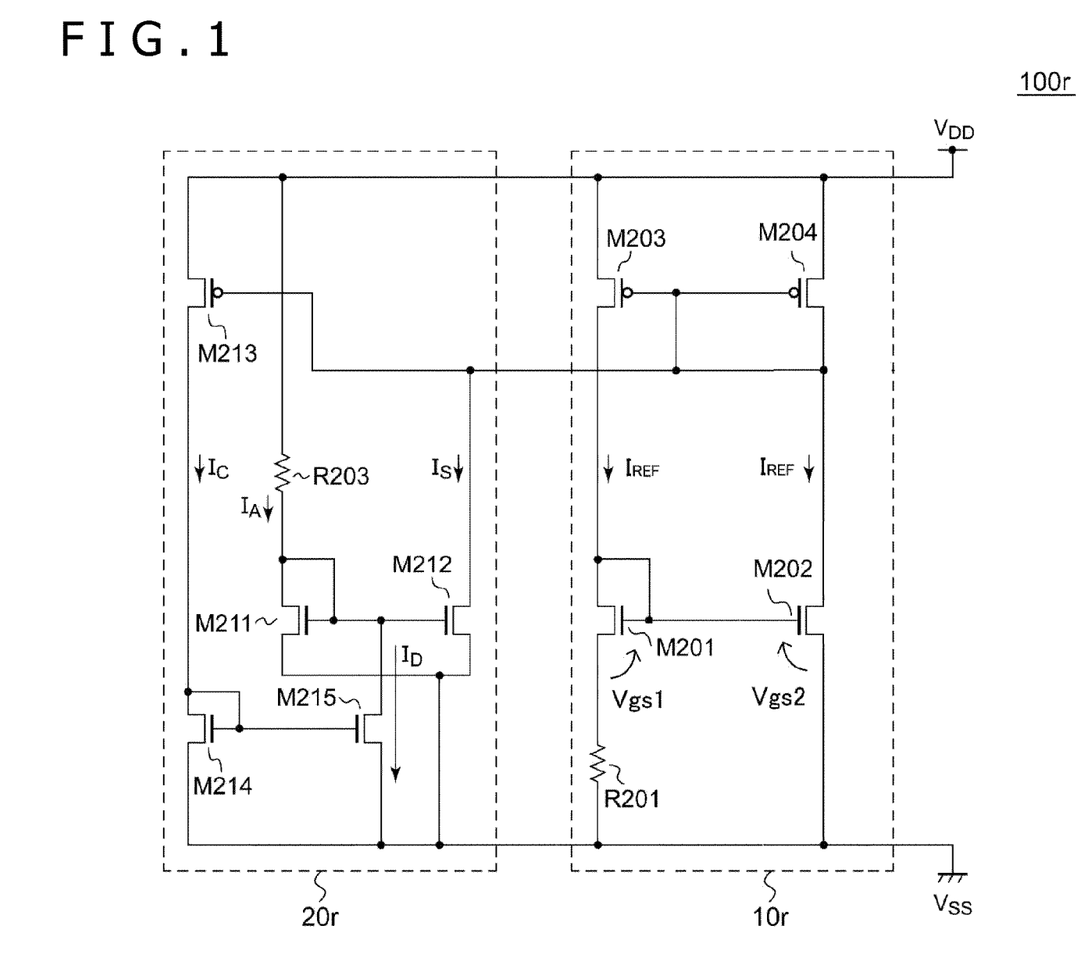
FIG. 1 is a circuit diagram of a reference current source circuit examined by the present inventors.

FIG. 1 is a circuit diagram of a reference current source circuit 100r examined by the present inventors. The reference current source circuit 100r includes, as primary components, a constant current circuit 10r and a starting circuit 20r. Note that the reference current source circuit 100r of FIG. 1 should not be recognized as a circuit known to the public.

The constant current circuit 10r includes transistors M201, M202, M203, and M204 and a resistor R201. Each of the transistors M203 and M204 is a positive (P)-channel metal oxide semiconductor field effect transistor (MOSFET), and gates of the transistors M203 and M204 as well as sources of the transistors M203 and M204 are connected in common to each other to form a current mirror with a mirror ratio of one.

Meanwhile, each of the transistors M201 and M202 is a negative-channel MOS (NMOS) transistor, and gates of the transistors M201 and M202 are connected to each other to form a current mirror. The resistor R201 is inserted between an emitter of the transistor M201 and a ground to form an inverse Widlar current mirror circuit (an inverse Widlar current source). The size ratio of the transistors M201 and M202 is 1:n.

A current that flows through each of the transistors M201 to M204 is defined as $I_{REF}$. When gate-source voltages of the transistors M201 and M202 are defined as $V_{gs1}$ and $V_{gs2}$, respectively, Equation (1) holds.

$$I_{REF} = (V_{gs1} - V_{gs2})/R \quad (1)$$

The transistors M201 and M202 operate in a saturation region. Equation (2) and Equation (3) hold for the transistor M201 and the transistor M202, respectively.

$$I_{REF} = \tfrac{1}{2} \times \mu_n C_{ox} \cdot (W/L)(V_{gs1} - V_{TH})^2 \quad (2)$$

$$I_{REF} = \tfrac{1}{2} \times \mu_n C_{ox} \cdot (n \cdot W/L)(V_{gs2} - V_{TH})^2 \quad (3)$$

$\mu_n$: mobility of NMOS transistor
$C_{ox}$: capacitance per unit area
W/L: ratio of gate width to gate length
$V_{TH}$: threshold voltage It is assumed that K=W/L holds. Equations (2) and (3) can be rewritten as Equations (4) and (5).

$$\sqrt{(2I_{REF}/\mu_n C_{ox} K)} = V_{gs1} - V_{TH} \quad (4)$$

$$\sqrt{(2I_{REF}/\mu_n C_{ox} \cdot nK)} = V_{gs2} - V_{TH} \quad (5)$$

Equations (4) and (5) are substituted into Equation (1), and Equation (1) is rearranged as follows.

$$I_{ref} = \frac{V_{gs1} - V_{gs2}}{R} = \frac{1}{R}\left(\sqrt{\frac{2I_{ref}}{\mu_n C_{ox}(K)}} - \sqrt{\frac{2I_{ref}}{\mu_n C_{ox}(nK)}}\right)$$

$$I_{ref} = \frac{1}{R}\sqrt{\frac{2I_{ref}}{\mu_n C_{ox}(K)}}\left(1 - \frac{1}{\sqrt{n}}\right)$$

$$I_{ref}^2 = \frac{1}{R^2}\frac{2I_{ref}}{\mu_n C_{ox}(K)}\left(1 - \frac{1}{\sqrt{n}}\right)^2$$

Thus, the reference current is expressed by Equation (6).

[Math. 2]

$$I_{ref} = \frac{1}{R^2}\frac{2}{\mu_n C_{ox}(K)}\left(1 - \frac{1}{\sqrt{n}}\right)^2 \quad (6)$$

The constant current circuit 10r typically has a plurality of stable operating points, one of which corresponds to the state of zero current. When the reference current source circuit 100r is started, the constant current circuit 10r may need to transition to a normal stable operating point with non-zero current, and the starting circuit 20r is accordingly provided to achieve that. The starting circuit 20r includes transistors M211, M212, M213, M214, and M215 and a resistor R203.

An operation at startup caused by start of a power supply voltage $V_{DD}$ will now be described below. Upon the start of the power supply voltage $V_{DD}$, the power supply voltage $V_{DD}$ is applied to the resistor R203, and a current $I_A$ starts flowing over a path including the resistor R203 and the transistor M211. The current $I_A$ is multiplied by a constant factor by a current mirror including the transistors M211 and M212, resulting in a flow of a starting current Is.

The starting current Is flows to the transistor M204 in the constant current circuit 10r, so that the current mirror circuit including the transistors M203 and M204 starts operating, and currents start to flow. As a result, the constant current circuit 10r becomes active, and soon shifts to a stable operating point.

Once the constant current circuit 10r becomes active, a current $I_C$ flows to the transistor M213 in the starting circuit 20r. A current mirror including the transistors M214 and M215 multiplies the current $I_C$ by a constant factor, and thus generates a current $I_D$. Element sizes are designed so that $I_D > I_A$ holds, and once the transistor current $I_D$ flows, the current flowing through the transistor M211 becomes zero, causing the starting current Is to become zero.

Examples of the related art are disclosed in Japanese Patent Laid-Open No. 2001-344028 and Japanese Patent Laid-Open No. 2006-133869.

SUMMARY

As a result of examining the startup of the reference current source circuit 100r of FIG. 1, the present inventors have come to recognize the following problem.

In the reference current source circuit 100r of FIG. 1, the transistors M204 and M213 form a current mirror circuit. Thus, even after the startup is completed, the current $I_C$, which is proportional to the current flowing through the transistor M204, continues to flow through the transistor M213, and the current $I_C$ continues to be copied, causing the current $I_D$ to continue flowing.

These currents $I_C$ and $I_D$ are of the order of several μA, causing no significant problem with circuits in the past, but for an integrated circuit (IC) used in a device for which battery replacement is difficult, a further reduction in current in the starting circuit is desirable.

The present technology has been conceived of in view of such a problem, and it is desirable to achieve a reduction in current in a reference current source circuit.

A reference current source circuit according to an embodiment of the present technology includes a constant current circuit configured to generate a reference current and a starting circuit configured to sink a starting current from the constant current circuit at startup. The starting circuit includes a first transistor; an impedance circuit provided between the first transistor and a ground line; a first current mirror circuit provided between the first transistor and a power supply line to return a current that flows to the first transistor; a second current mirror circuit configured to return an output current from the first current mirror circuit and generate the starting current; an inverter having an input connected to a connection node between the first transistor and the first current mirror circuit and having an output connected to a control terminal of the first transistor; a first current source configured to generate a first current when a power supply voltage of the power supply line has exceeded a first threshold value; a third current mirror circuit configured to draw a current proportional to the first current from an input side of the second current mirror circuit; and a second current source configured to supply a second current to the connection node between the first transistor and the first current mirror circuit when the power supply voltage has exceeded a second threshold value higher than the first threshold value.

Note that any combinations of the constituent elements described above as well as a method, a device, a system, and so on which have constituent elements or features of the present technology are also effective as embodiments of the present technology.

Embodiments of the present technology are able to achieve a reduction in power consumption of a reference current source circuit.

DETAILED DESCRIPTION OF THE PREFERRED EMBODIMENTS

Hereinafter, preferred embodiments of the present technology will be described with reference to the accompanying drawings. The same or equivalent constituent elements, parts, and processes illustrated in the accompanying drawings will be designated by the same reference numerals, and redundant description will be omitted as appropriate. Also note that the description of the embodiments will be provided by way of example, and is not meant to limit the technology. All features and combinations thereof described in the description of the embodiments are not essential to the technology.

When part A is described as being connected with part B in the present specification, it may mean that part A and part B are physically directly connected with each other, or that part A and part B are indirectly connected with each other with another part intervening therebetween which neither significantly affects electrical connection therebetween nor impairs a function or effect accomplished by the connection therebetween.

Similarly, when part C is described as being provided between part A and part B, it may mean that part A and part C and/or part B and part C are directly connected with each other, or that part A and part C and/or part B and part C are indirectly connected with each other with another part intervening therebetween which neither significantly affects electrical connection therebetween nor impairs a function or effect accomplished by the connection therebetween.

Figure 2:
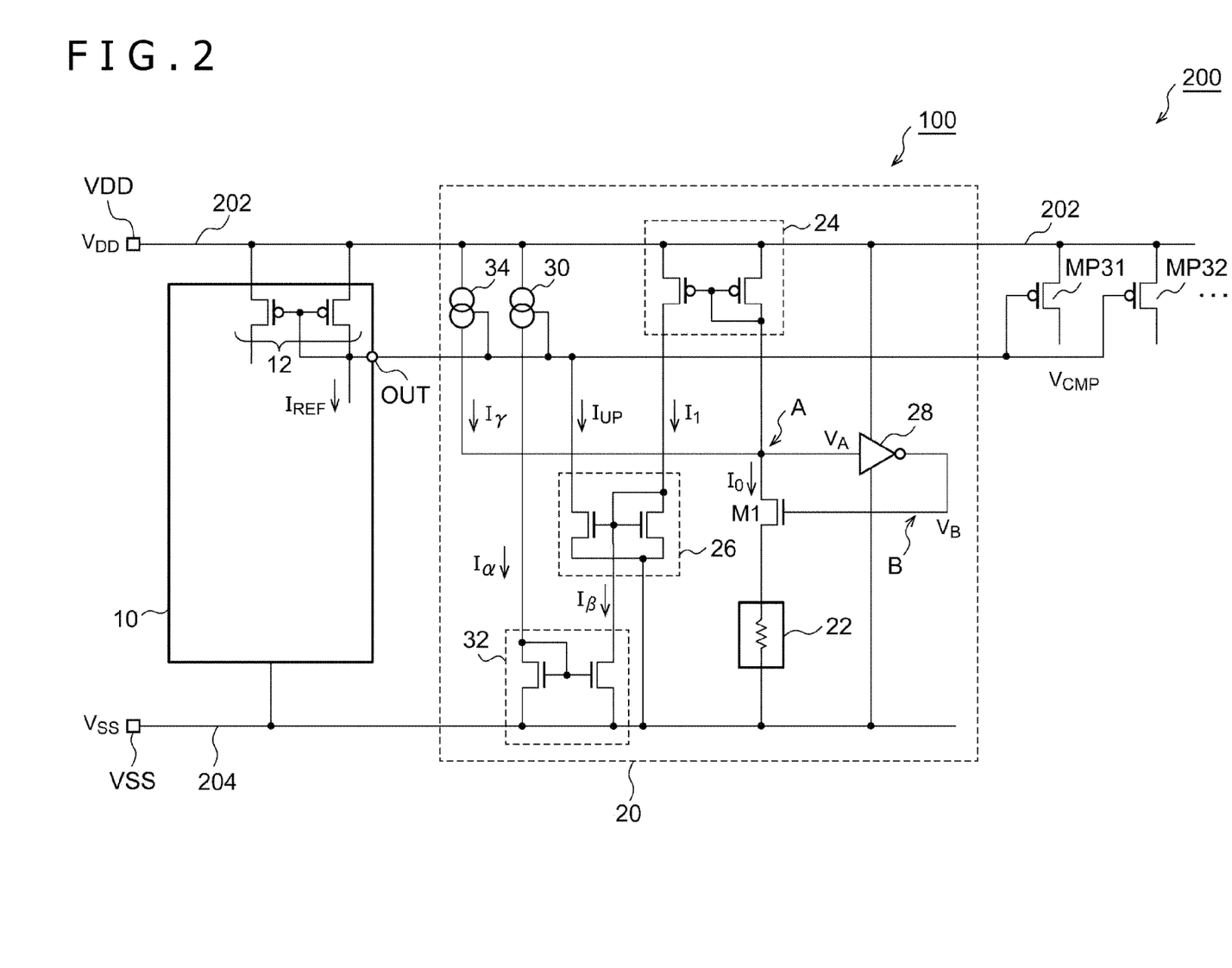
FIG. 2 is a block diagram of a semiconductor integrated circuit including a reference current source circuit according to an embodiment of the present technology.

FIG. 2 is a block diagram of a semiconductor integrated circuit 200 including a reference current source circuit 100 according to an embodiment of the present technology. The semiconductor integrated circuit 200 includes the reference current source circuit 100 and PMOS transistors MP31, MP32, . . . which are biased by a current mirror voltage $V_{CMP}$ generated by the reference current source circuit 100 and which copy a reference current $I_{REF}$.

The reference current source circuit 100 includes a constant current circuit 10 and a starting circuit 20.

The configuration of the constant current circuit 10 is not limited to particular configurations, and various forms which are known or will be available in the future can be adopted. The basic configuration and principle of the constant current circuit 10 are described in, for example, Behzad Razavi, "Design of Analog CMOS Integrated Circuits," chapter 11, and P. R. Gray, "Analysis and Design of Analog Integrated Circuits," chapter 4.4. It should be understood by those skilled in the art that there are various configurations that can be adopted in the constant current circuit 10 and that applications of the present technology are not limited to particular circuit forms concerning the constant current circuit 10.

Upon supply of a power supply voltage $V_{DD}$ at startup of the semiconductor integrated circuit 200, the starting circuit 20 sinks a starting current $I_{UP}$ from the constant current circuit 10. Typically, the constant current circuit 10 includes a current mirror circuit 12, and the starting current $I_{UP}$ is sunk from a gate of the current mirror circuit 12.

The starting circuit 20 includes a first transistor M1, an impedance circuit 22, a first current mirror circuit 24, a second current mirror circuit 26, an inverter 28, a first current source 30, a third current mirror circuit 32, and a second current source 34.

The first transistor M1 is an NMOS transistor. The impedance circuit 22 is provided between a source of the first transistor M1 and a ground line 204.

The first current mirror circuit 24 is provided between a drain of the first transistor M1 and a power supply line 202, and returns a current $I_0$ that flows to the first transistor M1. The second current mirror circuit 26 returns an output current $I_1$ from the first current mirror circuit 24, and generates the starting current $I_{UP}$.

The inverter 28 has an input connected to a connection node A between the first transistor M1 and the first current mirror circuit 24 and has an output connected to a control terminal (gate) B of the first transistor M1.

If the power supply voltage $V_{DD}$ of the power supply line 202 exceeds a first threshold value $V_{TH1}$ at the startup of the circuit, the first current source 30 generates a first current $I_\alpha$ proportional to the reference current $I_{REF}$. The third current mirror circuit 32 draws a current $I_\beta$ proportional to the first current $I_\alpha$ from an input side of the second current mirror circuit 26. Element sizes are designed so that $I_\beta > I_1$ holds.

If the power supply voltage $V_{DD}$ exceeds a second threshold value $V_{TH2}$, which is higher than the first threshold value $V_{TH1}$, the second current source 34 supplies a second current $I_\gamma$ proportional to the reference current $I_{REF}$ to the connection node A between the first transistor M1 and the first current mirror circuit 24, i.e., to the drain of the first transistor M1.

The configuration of the reference current source circuit 100 has been described above. Next, an operation thereof will be described.

Figure 3:
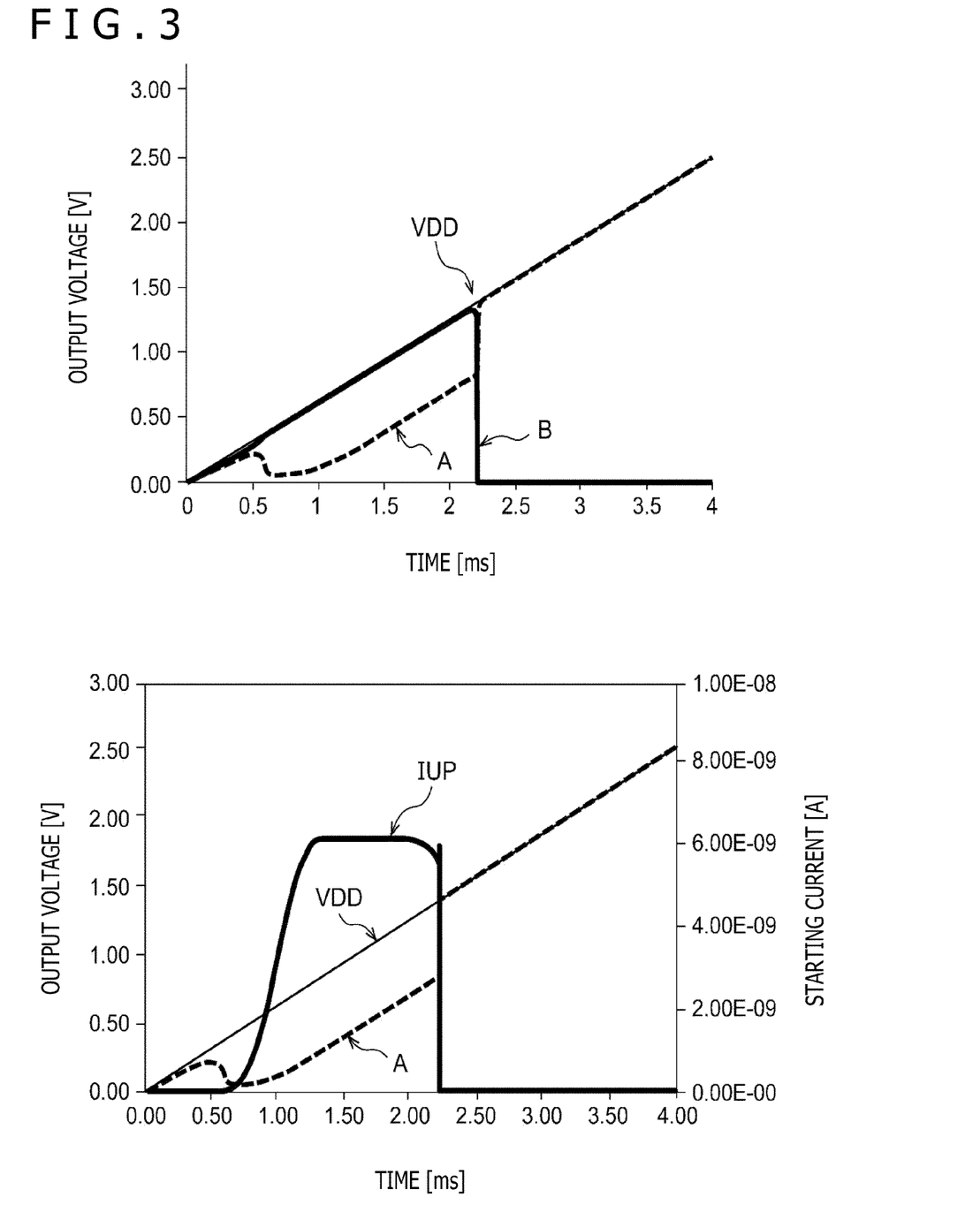
FIG. 3 illustrates operation waveform charts of the reference current source circuit in FIG. 2.

FIG. 3 illustrates operation waveform charts of the reference current source circuit 100 in FIG. 2. Before startup of the reference current source circuit 100, the power supply voltage $V_{DD}$ is 0 V. FIG. 3 illustrates the power supply voltage $V_{DD}$, voltages at the nodes A and B, and the starting current $I_{UP}$.

Once the power supply voltage $V_{DD}$ starts increasing, the voltage at the drain (node A) of the first transistor M1 starts increasing together with the power supply voltage $V_{DD}$. Immediately after the startup, the voltage $V_A$ at the node A is lower than a threshold value of the inverter 28, and the output of the inverter 28 is high, and thus, the voltage $V_B$ at the output B of the inverter 28 increases in line with the power supply voltage $V_{DD}$.

The first transistor M1 operates as a source follower, and $V_B - V_{GS1}$ is applied across the impedance circuit 22, so that the current $I_0$ starts flowing through the impedance circuit 22 and the first transistor M1. Represented by $V_{GS1}$ is a gate-source voltage of the first transistor M1, and R represents an impedance of the impedance circuit 22.

$$I_0 = (V_B - V_{GS1})/R = (V_{DD} - V_{GS1})/R$$

The current $I_0$ is copied by the first current mirror circuit 24 and the second current mirror circuit 26, and the starting current $I_{UP}$ is sunk from the constant current circuit 10. The constant current circuit 10 starts operating with the starting current $I_{UP}$ as a trigger, and the reference current $I_{REF}$ is generated by the constant current circuit 10.

Once the power supply voltage $V_{DD}$ exceeds the first threshold value $V_{TH1}$, the first current source 30 becomes active, so that the first current $I_\alpha$, which is proportional to the reference current $I_{REF}$, starts flowing. The first current $I_\alpha$ is copied by the third current mirror circuit 32, and the current $I_\beta$ is drawn from a gate of the second current mirror circuit 26. Because $I_\beta > I_1$ holds, a current flowing through an NMOS transistor on the input side (the right side in the figure) of the second current mirror circuit 26 becomes zero, and the starting current Top on the output side also becomes zero.

Once the power supply voltage $V_{DD}$ further increases and exceeds the second threshold value $V_{TH2}$, the second current source 34 becomes active, and supplies the second current $I_\gamma$, which is proportional to the reference current $I_{REF}$, to the connection node A between the first transistor M1 and the first current mirror circuit 24, i.e., to the drain of the first transistor M1. The second current $I_\gamma$ is greater than the current $I_0$ which flows to the first transistor M1. Thus, the voltage at the drain A of the first transistor M1 increases up to a value close to that of the power supply voltage $V_{DD}$. At this time, the second current $I_\gamma$ generated by the second current source 34 becomes zero.

Then, once the voltage $V_A$ at the node A exceeds the threshold value of the inverter 28, the output B of the inverter 28 becomes low, and the voltage $V_B$ is fixed to a ground voltage of 0 V. As a result, the first transistor M1 is fixed in an OFF state, resulting in complete interruption of the current $I_0$.

The operation of the reference current source circuit 100 has been described above.

According to the reference current source circuit 100, a current does not flow in the starting circuit 20 after the startup is completed, and this leads to reduced power consumption.

Figure 4:
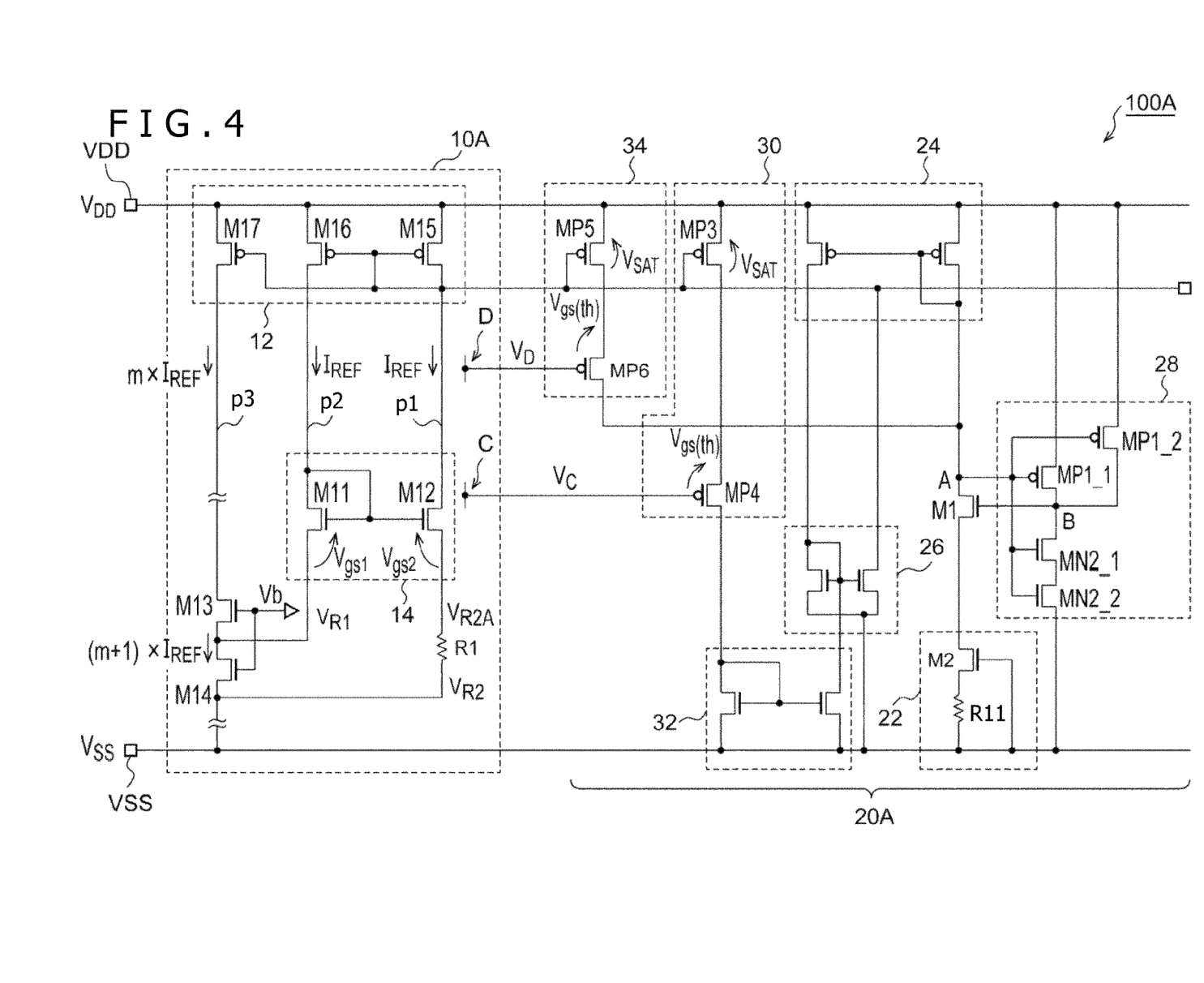
FIG. 4 is a circuit diagram of a reference current source circuit according to an embodiment of the present technology.

Next, an example of a specific configuration of the reference current source circuit 100 will be described below. FIG. 4 is a circuit diagram of a reference current source circuit 100A according to an embodiment of the present technology.

Reference is made to a starting circuit 20A. An impedance circuit 22 includes a depletion-type NMOS transistor M2 with a gate connected to a ground and a resistor R11 provided between a source thereof and a ground line 204.

An inverter 28 includes two PMOS transistors MP1_1 and MP1_2 on the high side and two NMOS transistors MN2_1 and MN2_2 on the low side. The PMOS transistors MP1_1 and MP1_2 are connected in parallel, while the two NMOS transistors MN2_1 and MN2_2 are connected in series. The size of the PMOS transistor MP1_2 is smaller than the size of the PMOS transistor MP1_1. The parallel connection of the two PMOS transistors MP1_1 and MP1_2 allows optimization of the sizes of the PMOS transistors on the upper side of the inverter. This leads to optimization of a transition time during which a state transition of the inverter 28 is achieved.

A first current source 30 includes PMOS transistors MP3 and MP4. The PMOS transistor MP3 has a gate connected to an output of a constant current circuit 10A, forms a current mirror circuit together with a transistor in the constant current circuit 10A, and generates a first current $I_\alpha$ proportional to a reference current $I_{REF}$. A gate of the PMOS transistor MP4 is connected to an internal node C at which a constant voltage $V_C$ of the constant current circuit 10A is generated.

It is assumed that a saturation voltage of the PMOS transistor MP3 is $V_{SAT}$ and a gate threshold voltage of the PMOS transistor MP4 is $V_{gs(th)}$. Once a power supply voltage $V_{DD}$ exceeds $V_{TH1} = V_C + V_{gs(th)} + V_{SAT}$, the PMOS transistor MP4 is turned on, enabling the first current source 30. A first threshold voltage $V_{TH1}$ to enable the first current source 30 can be designed according to the constant voltage $V_C$.

A second current source 34 includes PMOS transistors MP5 and MP6. The PMOS transistor MP5 has a gate connected to the output of the constant current circuit 10A, forms a current mirror circuit together with the transistor in the constant current circuit 10A, and generates a second current $I_\gamma$ proportional to the reference current $I_{REF}$. A constant voltage $V_D$ of the constant current circuit 10A is generated at an internal node D, and the voltage $V_D$ at the internal node D is applied to a gate of the PMOS transistor MP6.

It is assumed that a saturation voltage of the PMOS transistor MP5 is $V_{SAT}$ and a gate threshold voltage of the PMOS transistor MP6 is $V_{gs(th)}$. Once the power supply voltage $V_{DD}$ exceeds $V_{TH2} = V_D + V_{gs(th)} + V_{SAT}$, the PMOS transistor MP6 is turned on, enabling the second current source 34. A second threshold voltage $V_{TH2}$ to enable the second current source 34 can be designed according to the constant voltage $V_D$.

Next, reference is made to the constant current circuit 10A. The constant current circuit 10A includes a fourth current mirror circuit 12, a fifth current mirror circuit 14, NMOS transistors M13 and M14, and a resistor R1.

The fifth current mirror circuit 14 includes a first NMOS transistor M11 on the input side and a second NMOS transistor M12 on the output side. The fourth current mirror circuit 12 includes PMOS transistors M15, M16, and M17. The fourth current mirror circuit 12 supplies a current $I_{REF}$ equal in amount to a current $I_{REF}$ that flows to a first path p1 including the second NMOS transistor M12 to a second path p2 including the first NMOS transistor M11, and supplies, to a third path p3, a current having a current amount, $m \times I_{REF}$, equal to that of the current flowing to the first path multiplied by a predetermined number (m).

The third NMOS transistor M13 is provided on the third path p3, and a source thereof is connected to one end (source) of the first NMOS transistor M11. The fourth NMOS transistor M14 is provided on the lower potential side of the third NMOS transistor M13 on the third path p3. A gate of the fourth NMOS transistor M14 is connected in common to a gate of the third NMOS transistor M13, and a bias voltage Vb is applied thereto. The resistor R1 is provided between a source of the fourth NMOS transistor M14 and one end (source) of the second NMOS transistor M12.

It is assumed that the third NMOS transistor M13 and the fourth NMOS transistor M14 operate in a subthreshold region. In the subthreshold region, a drain current $I_D$ is expressed by Equation (7).

[Math. 3]

$$I_D = K I_0 \exp\left(\frac{V_{gs} - V_{TH}}{\eta V_T}\right) \qquad (7)$$

$V_T$: thermal voltage (=kT/q)
η: subthreshold factor
k: the Boltzmann constant
q: electron charge
T: absolute temperature
ρ: temperature coefficient of resistance A voltage across a resistor R (i.e., a voltage drop) will be calculated. Regarding gate-source voltages $V_{gs3}$ and $V_{gs4}$ of the transistors M13 and M14, the following equations hold.

$$V_b - V_{gs3} = V_{R1}$$

$$V_b - V_{gs4} = V_{R2}$$

In the present embodiment, the sizes of the transistors M11 and M12 are equal to each other. Therefore, regarding the transistors M11 and M12, the following equations hold.

$$V_{R1} + V_{gs1} - V_{gs2} = V_{R2A}$$

$$V_{gs1} = V_{gs2}$$

Therefore, $V_{R1} = V_{R2A}$.
The reference current $I_{REF}$ is expressed by Equation (8).

[Math. 4]

$$\begin{aligned} I_{ref} &= \frac{V_{R2A} - V_{R2}}{R} \\ &= \frac{V_{R1} - V_{R2}}{R} \\ &= \frac{(V_b - V_{gs3}) - (V_b - V_{gs4})}{R} \\ &= \frac{V_{gs4} - V_{gs3}}{R} \end{aligned} \qquad (8)$$

Equation (7) can be rewritten as Equation (9).

[Math. 5]

$$\eta V_T \ln\left(\frac{I_D}{K I_0}\right) + V_{TH} = V_{gs} \qquad (9)$$

Focus is now placed on the third NMOS transistor M13. Since $m \times I_{REF}$ flows to the third NMOS transistor M13, $I_D = m \times I_{REF}$ is substituted into Equation (9), so that the gate-source voltage $V_{gs3}$ is given by Equation (10). Represented by $K_3$ is W/L of the third NMOS transistor M13.

[Math. 6]

$$V_{gs3} = \eta V_T \ln\left(\frac{m I_{ref}}{K_3 I_0}\right) + V_{TH} \qquad (10)$$

Next, focus is now placed on the fourth NMOS transistor M14. Because the sum, $(m+1) \times I_{REF}$, of the current, $m \times I_{REF}$, which flows to the third NMOS transistor M13, and the current, $I_{REF}$, which flows to the first transistor M11, flows to the fourth NMOS transistor M14, $I_D = (m+1) \times I_{REF}$ is substituted into Equation (9), and the gate-source voltage $V_{gs4}$ is given by Equation (11). Represented by $K_4$ is W/L of the fourth NMOS transistor M14.

[Math. 7]

$$V_{gs4} = \eta V_T \ln\left(\frac{(m+1) I_{ref}}{K_4 I_0}\right) + V_{TH} \qquad (11)$$

Equations (10) and (11) are substituted into Equation (8), so that the reference current $I_{REF}$ is given by Equation (12).

[Math. 9]

$$\begin{aligned} I_{ref} &= \frac{V_{gs4} - V_{gs3}}{R} \\ &= \frac{\eta V_T \ln\left(\frac{(m+1) I_{ref}}{K_4 I_0}\right) + V_{TH} - \left\{\eta V_T \ln\left(\frac{m I_{ref}}{K_3 I_0}\right) + V_{th}\right\}}{R} \\ &= \frac{1}{R} \cdot \eta V_T \left\{\ln\left(\frac{(m+1) I_{ref}}{K_4 I_0}\right) - \ln\left(\frac{m I_{ref}}{K_3 I_0}\right)\right\} \end{aligned} \qquad (12)$$

Equation (12) is rearranged, so that the reference current $I_{REF}$ can be expressed by Equation (13).

[Math. 9]

$$I_{ref} = \frac{\eta V_T}{R} \ln\left(\frac{(m+1) K_3}{m K_4}\right) \qquad (13)$$

A temperature characteristic of the resistor R is expressed by Equation (14).

$$R = R_0 + \rho T \qquad (14)$$

$R_0$ is a resistance value when T=0 holds.

Equation (14) is substituted into Equation (13), so that Equation (15) is obtained.

[Math. 10]

$$I_{ref} = \frac{\eta kT}{q(R_0 + \rho T)} \ln\left(\frac{(m+1)K_3}{m\ K_4}\right) \qquad (15)$$

In short, the constant current circuit 10A in FIG. 4 is able to generate the reference current $I_{REF}$ according to the thermal voltage $V_T$, the subthreshold factor, and the resistor. Then, temperature characteristics of the reference current $I_{REF}$ can be adjusted by adjusting the sizes $K_3$ and $K_4$ of the third NMOS transistor M13 and the fourth NMOS transistor M14, respectively, or the mirror ratio m.

Figure 5:
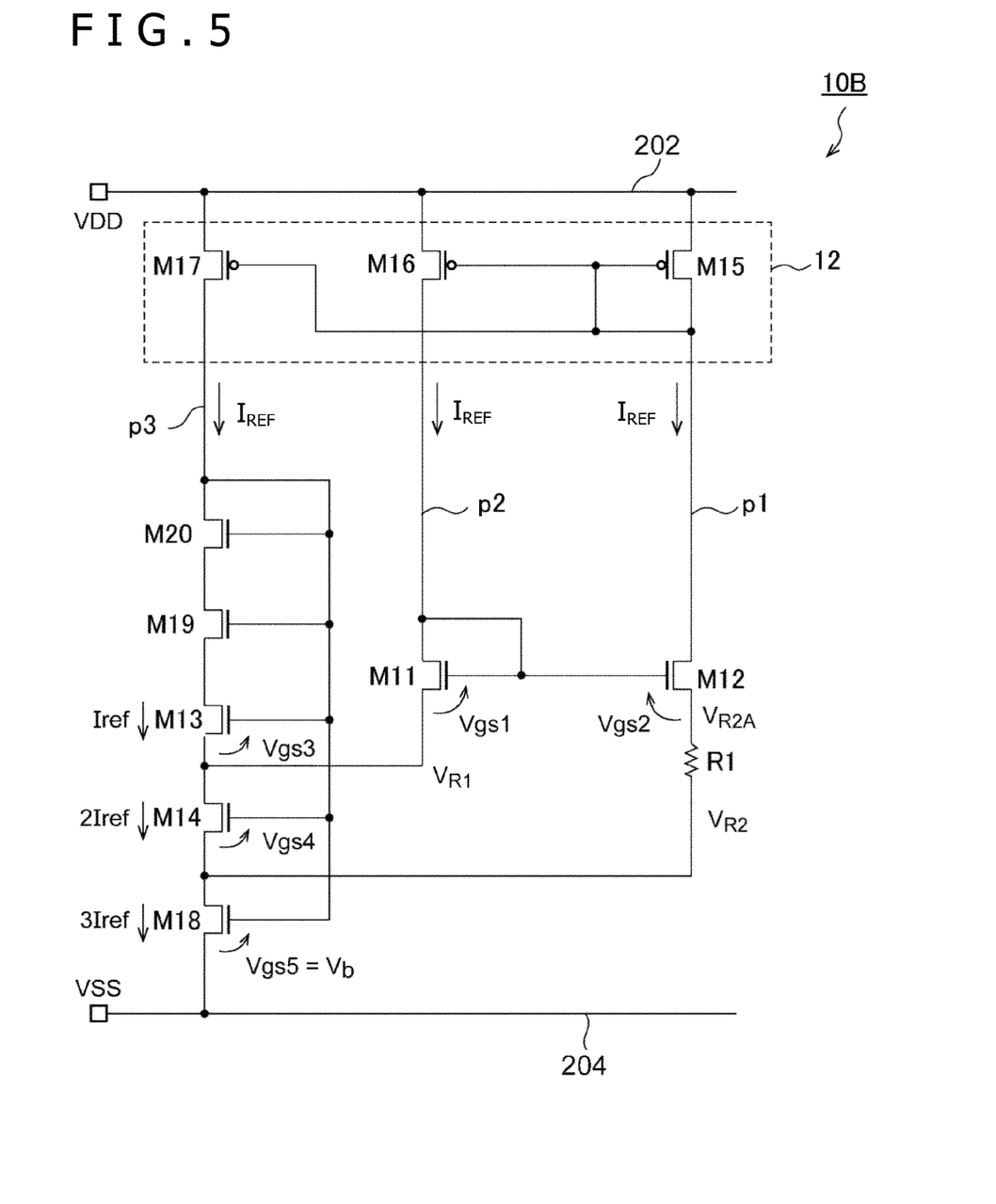
FIG. 5 is a circuit diagram of a constant current circuit according to an embodiment of the present technology.

FIG. 5 is a circuit diagram of a constant current circuit 10B according to an embodiment of the present technology. A transistor M18 is provided on the lower potential side of a fourth NMOS transistor M14 on a third path p3, and one end (source) of the transistor M18 is connected to a ground line 204. The sum, (m+2)×$I_{REF}$, of a current, (m+1)×$I_{REF}$, which flows to the fourth NMOS transistor M14, and a current, $I_{REF}$, which flows to a second NMOS transistor M12, flows to the transistor M18.

A voltage $V_{gs5}$ at a control terminal (i.e., a gate) of the transistor M18 is applied, as the bias voltage $V_b$ in FIG. 4, to gates of the NMOS transistor M13 and the NMOS transistor M14.

In FIG. 5, the mirror ratio of a fourth current mirror circuit 12 is m=1, and a current that flows to the third path p3 is equal to the reference current $I_{REF}$.

At least one NMOS transistor may be inserted on the drain side of the third transistor M13 on the third path p3. In FIG. 5, two NMOS transistors M19 and M20 are inserted, and the bias voltage $V_b$ is applied to gates thereof.

The transistors M13 and M14 are able to operate in the subthreshold region with the transistors M19 and M20 being inserted and a drain of the transistor M20 being connected to a gate of the transistor M18.

Since m=1 holds, the reference current $I_{REF}$ is given by Equation (16).

[Math. 11]

$$I_{ref} = \frac{\eta kT}{q(R_0 + \rho T)} \ln\left(\frac{2K_3}{K_4}\right) \qquad (16)$$

In short, the constant current circuit 10B in FIG. 5 is able to generate the reference current $I_{REF}$ according to the thermal voltage $V_T$, the subthreshold factor, and the resistor R. Then, temperature characteristics of the reference current $I_{REF}$ can be adjusted by adjusting the sizes $K_3$ and $K_4$ of the transistors M13 and M14, respectively.

Figure 6:
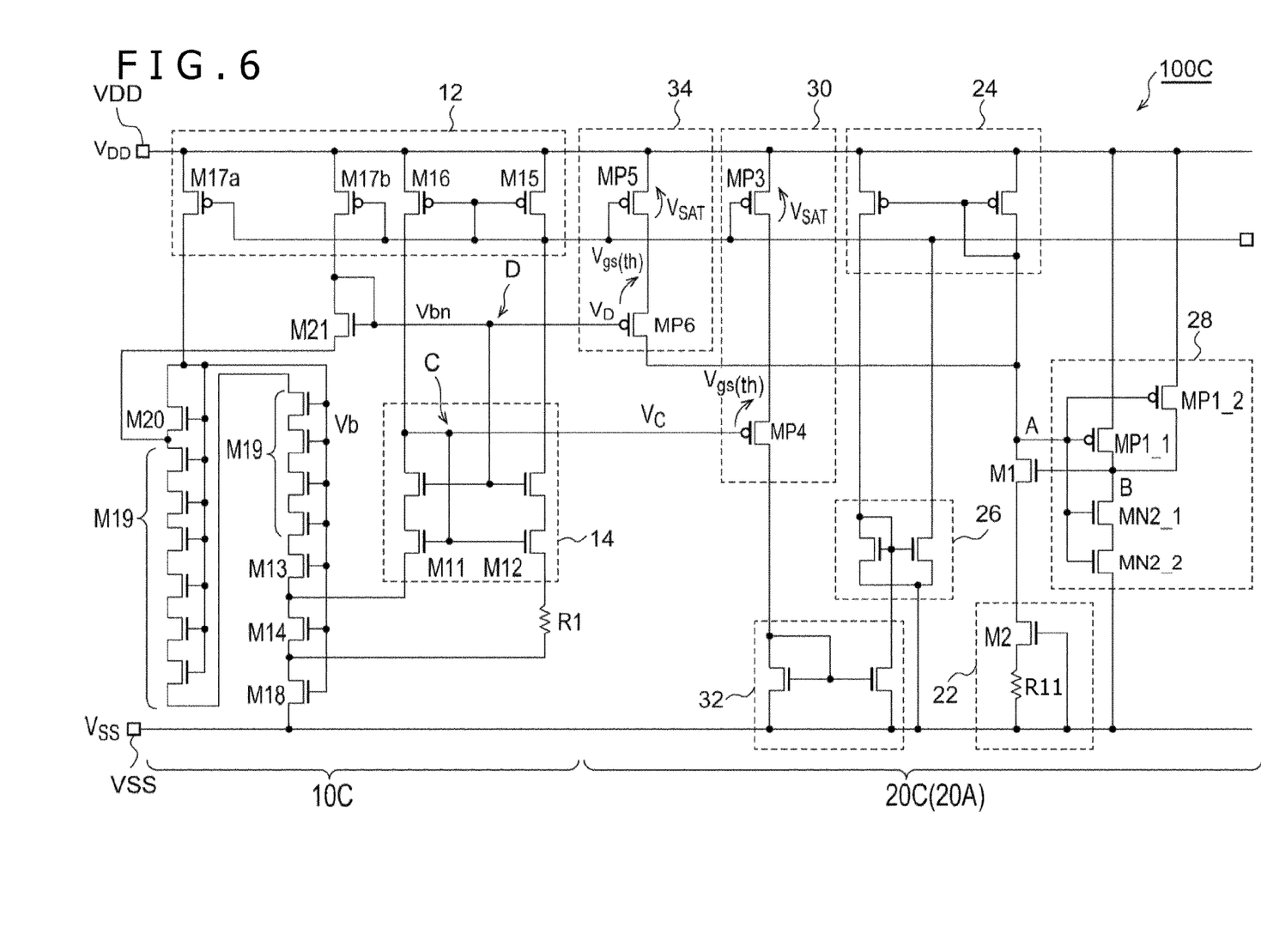
FIG. 6 is a circuit diagram of a reference current source circuit according to an embodiment of the present technology.

FIG. 6 is a circuit diagram of a reference current source circuit 100C according to an embodiment of the present technology. The configuration of a starting circuit 20C is similar to that of the starting circuit 20A in FIG. 4.

A constant current circuit 10C is a modification of the constant current circuit 10A in FIG. 4. A fifth current mirror circuit 14 is a low-voltage cascode current mirror. A bias voltage Vbn for the fifth current mirror circuit 14 is a voltage $V_D$ at a node D.

A bias voltage Vb is generated by a transistor M17b in a fourth current mirror circuit 12, an NMOS transistor M21, and transistors M19, M13, M14, and M18 on a third path.

Gates of transistors M11 and M12 in the fifth current mirror circuit 14 correspond to a node C.

This configuration allows appropriate threshold voltages $V_{TH1}$ and $V_{TH2}$ to be set for a first current source 30 and a second current source 34.

Figure 7:
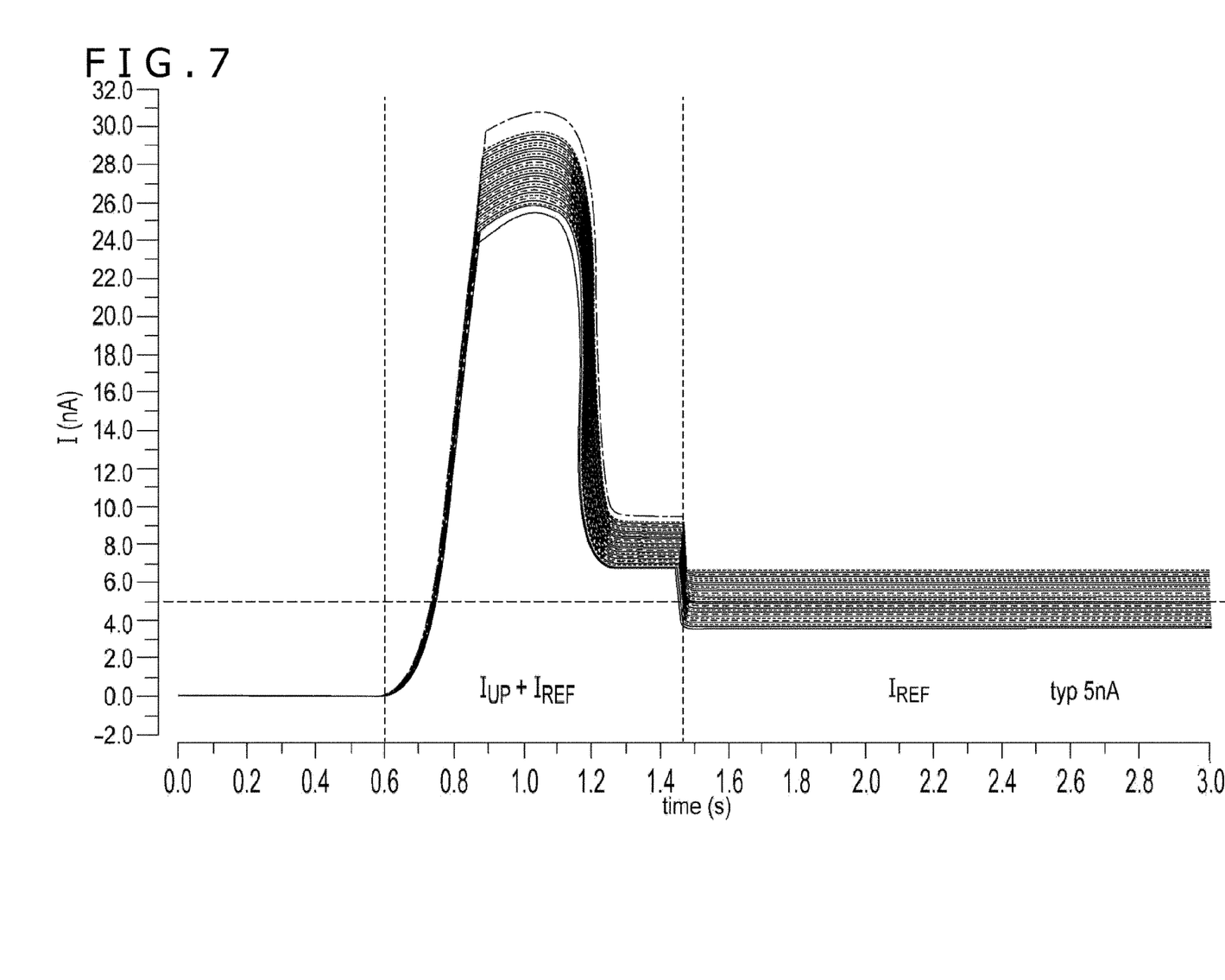
FIG. 7 is a diagram illustrating an operation waveform chart of the reference current source circuit in FIG. 6.
Figure 8A:
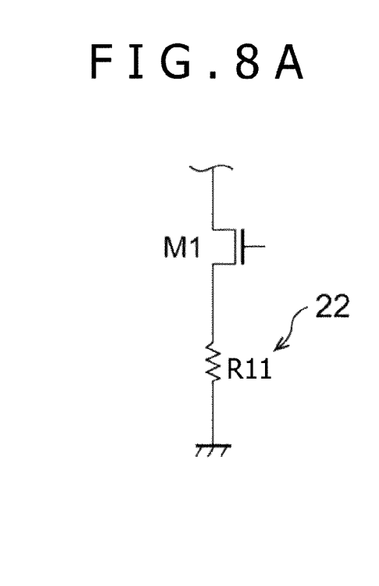
FIGS. 8A, 8B, 8C, and 8D are each a circuit diagram illustrating an impedance circuit according to a modification of an embodiment of the present technology.
Figure 8B:
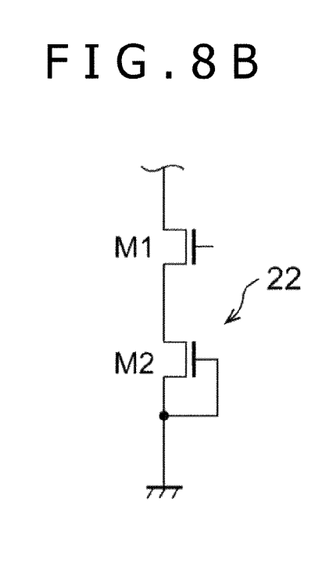
Figure 8C:
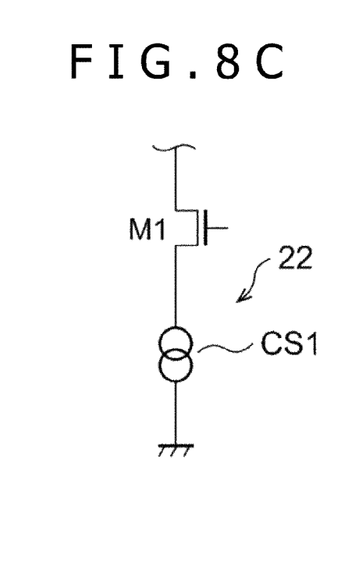
Figure 8D:
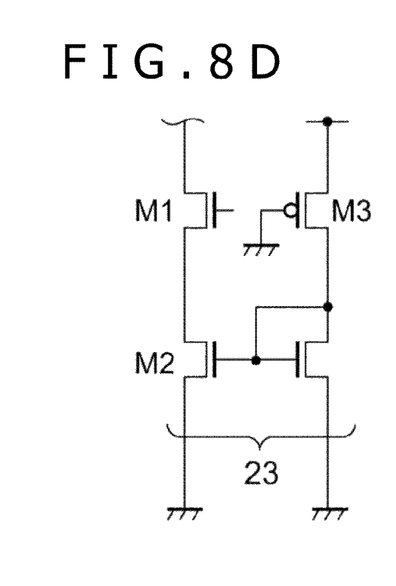

FIG. 7 is a diagram illustrating an operation waveform chart (a simulation result) of the reference current source circuit 100C in FIG. 6. Employing a Monte Carlo method, all currents in the reference current source circuit 100C have been calculated with element variations taken into account. In the period between 0.6 and 1.44 s, which corresponds to a startup period, the reference current $I_{REF}$ and the starting current $I_{UP}$ flow. After 1.44 s, the reference current $I_{REF}$ having a constant value is generated, and a typical value thereof is 5 nA.

The present technology has been described above with reference to embodiments thereof. It should be understood by those skilled in the art that the above embodiments have been described by way of example and that various modifications are possible with respect to combinations of components and processes thereof and such modifications also fall within the scope of the present technology. Such modifications will now be described below.

FIGS. 8A, 8B, 8C, and 8D are each a circuit diagram illustrating a modification of the impedance circuit 22. An impedance circuit 22 in FIG. 8A includes a resistor R11. An impedance circuit 22 in FIG. 8B includes a depletion transistor M2 having a gate connected to a ground. An impedance circuit 22 in FIG. 8C includes a current source. An impedance circuit 22 in FIG. 8D includes a PMOS transistor M3 having a gate connected to a ground and a current mirror circuit 23 that copies a current that flows to the PMOS transistor M3.

As described above, the configuration of the constant current circuit 10 is not limited.

The configurations of the first current source 30 and the second current source 34 are not limited as long as the first current source 30 and the second current source 34 are configured to be enabled in the order named in association with the increase of the power supply voltage $V_{DD}$.

Note that elements described as MOS transistors in the embodiments may be replaced with bipolar transistors.

The present technology has been described above using specific terms with reference to embodiments thereof. It should be understood that the embodiments merely represent principles and applications of the present technology and that various modifications and changes in configuration may be made in the embodiments without departing from the ideas of the present technology as defined in the appended claims.

What is claimed is:

1. A reference current source circuit comprising:
    a constant current circuit configured to generate a reference current; and
    a starting circuit configured to sink a starting current from the constant current circuit at startup, wherein the starting circuit includes
        a first transistor,
        an impedance circuit provided between the first transistor and a ground line, a first current mirror circuit provided between the first transistor and a power supply line to return a current that flows to the first transistor, a second current mirror circuit configured to return an output current from the first current mirror circuit, and generate the starting current, an inverter having an input connected to a connection node between the first transistor and the first current mirror circuit, and having an output connected to a control terminal of the first transistor, a first current source configured to generate a first current when a power supply voltage of the power supply line has exceeded a first threshold value, a third current mirror circuit configured to draw a current proportional to the first current from an input side of the second current mirror circuit, and a second current source configured to supply a second current to the connection node between the first transistor and the first current mirror circuit when the power supply voltage has exceeded a second threshold value higher than the first threshold value.

2. The reference current source circuit according to claim 1, wherein the impedance circuit includes a resistor.

3. The reference current source circuit according to claim 1, wherein the impedance circuit includes a depletion-type negative-channel metal oxide semiconductor transistor having a gate connected to a ground.

4. The reference current source circuit according to claim 3, wherein the impedance circuit further includes a resistor connected in series with the negative-channel metal oxide semiconductor transistor.

5. The reference current source circuit according to claim 1, wherein the impedance circuit includes a current source.

6. The reference current source circuit according to claim 1, wherein the inverter includes two positive-channel metal oxide semiconductor transistors connected in parallel, and two negative-channel metal oxide semiconductor transistors connected in series.

7. The reference current source circuit according to claim 6, wherein the two positive-channel metal oxide semiconductor transistors have different sizes.

8. The reference current source circuit according to claim 1, wherein the constant current circuit includes a fifth current mirror circuit including a first negative-channel metal oxide semiconductor transistor on an input side and a second negative-channel metal oxide semiconductor transistor on an output side, a fourth current mirror circuit configured to supply a current equal in amount to a current that flows to a first path including the second negative-channel metal oxide semiconductor transistor to a second path including the first negative-channel metal oxide semiconductor transistor, and supply, to a third path, a current having a current amount equal to that of the current flowing to the first path multiplied by a predetermined number, a third negative-channel metal oxide semiconductor transistor provided on the third path, the third negative-channel metal oxide semiconductor transistor having a source connected to one end of the first negative-channel metal oxide semiconductor transistor, a fourth negative-channel metal oxide semiconductor transistor provided on a lower potential side of the third negative-channel metal oxide semiconductor transistor on the third path, the fourth negative-channel metal oxide semiconductor transistor having a gate connected in common to a gate of the third negative-channel metal oxide semiconductor transistor, and a resistor provided between a source of the fourth negative-channel metal oxide semiconductor transistor and one end of the second negative-channel metal oxide semiconductor transistor.

* * * * *